US012699874B2

(12) United States Patent
Bhojanapalli et al.

(10) Patent No.: US 12,699,874 B2
(45) Date of Patent: Aug. 4, 2026

(54) LEVERAGING REDUNDANCY IN ATTENTION WITH REUSE TRANSFORMERS

(71) Applicant: Google LLC, Mountain View, CA (US)

(72) Inventors: Venkata S. Bhojanapalli, New York, NY (US); Andreas Veit, New York, NY (US); Ayan Chakrabarti, New York, NY (US); Frederick Liu, Bellevue, WA (US); Himanshu Jain, New York, NY (US); Michal Lukasik, New York, NY (US); Sanjiv Kumar, Jericho, NY (US); Yin-Wen Chang, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 829 days.

(21) Appl. No.: 17/960,380

(22) Filed: Oct. 5, 2022

(65) Prior Publication Data
US 2023/0112862 A1    Apr. 13, 2023

Related U.S. Application Data

(60) Provisional application No. 63/252,489, filed on Oct. 5, 2021.

(51) Int. Cl.
*G06N 3/04*        (2023.01)
(52) U.S. Cl.
CPC ..................................... *G06N 3/04* (2013.01)

(58) Field of Classification Search
CPC ........ G06N 3/04; G06N 3/044; G06N 3/0464; G06N 3/084; G06N 3/045; G06N 20/00
See application file for complete search history.

(56) References Cited

U.S. PATENT DOCUMENTS

| | | | | |
|---|---|---|---|---|
| 2021/0319288 A1* | 10/2021 | Wagner | ................. | G06F 40/289 |
| 2021/0334475 A1* | 10/2021 | He | ......................... | G06F 40/237 |
| 2023/0176242 A1* | 6/2023 | Xu | ......................... | G01V 1/302 |
| | | | | 702/14 |

OTHER PUBLICATIONS

Xiao, Tong, et al. "Sharing attention weights for fast transformer." arXiv preprint arXiv:1906.11024 (2019). (Year: 2019).*
Dai, Zihang, et al. "Transformer-xl: Attentive language models beyond a fixed-length context." arXiv preprint arXiv:1901.02860 (2019). (Year: 2019).*
Vaswani, Ashish, et al. "Attention is all you need." Advances in neural information processing systems 30 (2017). (Year: 2017).*
(Continued)

*Primary Examiner* — Miranda M Huang
*Assistant Examiner* — Sidney Vincent Bostwick
(74) *Attorney, Agent, or Firm* — DORITY & MANNING P.A.

(57) ABSTRACT

Provided are systems and methods that improve the computational efficiency of Transformers or other attention-based neural networks or machine learning models by re-using a number of attention scores between layers and/or heads of the model. To reduce the computational cost of self-attention-based models while achieving comparable or even superior results, example aspects of the present disclosure propose a novel architecture that reuses attention scores computed in one layer in one or multiple subsequent layers.

23 Claims, 7 Drawing Sheets

(56) References Cited

OTHER PUBLICATIONS

Behnke, Maximiliana, and Kenneth Heafield. "Losing Heads in the Lottery: Pruning Transformer." The 2020 Conference on Empirical Methods in Natural Language Processing. Association for Computational Linguistics (ACL), 2020. (Year: 2020).*

Maziarka, Łukasz, et al. "Molecule attention transformer." arXiv preprint arXiv:2002.08264 (2020). (Year: 2020).*

Liu, Liyuan, Jialu Liu, and Jiawei Han. "Multi-head or single-head? an empirical comparison for transformer training." arXiv preprint arXiv:2106.09650 (2021). (Year: 2021).*

He, Ruining, et al. "Realformer: Transformer likes residual attention." Findings of the association for computational linguistics: ACL-IJCNLP 2021. 2021. (Year: 2021).*

* cited by examiner

EACH BLOCK

EACH HEAD IN EACH BLOCK

LEVERAGING REDUNDANCY IN ATTENTION WITH REUSE TRANSFORMERS

RELATED APPLICATIONS

This application claims priority to U.S. Provisional Patent Application No. 63/252,489, filed Oct. 5, 2021. U.S. Provisional Patent Application No. 63/252,489 is hereby incorporated by reference in its entirety.

FIELD

The present disclosure relates generally to machine learning. More particularly, the present disclosure relates to systems and methods that improve the computational efficiency of Transformers or other attention-based neural networks or machine learning models by re-using a number of attention scores between layers and/or heads of the model.

BACKGROUND

Recently, attention-based models such as those generally referred to as "Transformers" have shown high quality results across a number of tasks. These high quality results are largely achieved by or a function of the performance of "self-attention" operations (also known as an "attention mechanism") by the model.

In some example self-attention operations, an attention score can be computed for each embedding within a sequence of input embeddings relative to all other embeddings within the sequence. This process or operation can be performed a significant number of times within any given model. For example, a typical Transformer model will contain a number of attention layers, where each attention layer includes a number of attention heads, with each attention head performing a self-attention operation as described above on the respective input to the layer.

Attention operations are relatively computationally costly (e.g., require significant amounts of processor usage and/or memory space). Further, it is well known that the cost of attention computation grows quadratically with input sequence length and this poses challenges for training models for long sequence length tasks.

More particularly, Transformers are sequence to sequence models that achieve state of the art performance across tasks in Natural Language Processing and Computer Vision. Transformers achieve high performance with their attention layers that compute contextual embedding of the input sequence. In some examples, the attention layer can compute attention scores based on the pairwise dot product of input tokens. Typically there are multiple such self-attention heads in a layer that operate on different projections of the input.

Self-attention layers have been the subject of much of the recent research with analysis on interpretability of attention scores, and role of attention in language understanding. Much of this analysis is qualitative or focuses on specific natural language abilities of attention layers and, as such, fails to remedy the computational challenges associated with attention layers.

SUMMARY

Aspects and advantages of embodiments of the present disclosure will be set forth in part in the following description, or can be learned from the description, or can be learned through practice of the embodiments.

One example aspect of the present disclosure is directed to a computing system for performing attention with improved computational efficiency. The computing system includes one or more processors and one or more non-transitory computer-readable media that collectively store: a machine-learned model configured to perform attention operations on a model input to generate a model output, wherein the machine-learned model comprises a plurality of attention layers, and wherein each attention layer comprises a plurality of attention heads; and instructions that, when executed by the one or more processors, cause the computing system to perform operations. The operations include obtaining the model input. The operations include processing the model input with the machine-learned model to generate the model output. Processing the model input with the machine-learned model comprises, for one or more reuse layers of the plurality of attention layers includes: receiving a layer input; accessing one or more attention scores computed for a previous layer of the plurality of attention layers; and for one or more reuse heads of the plurality of attention heads of the reuse layer, re-using the one or more attention scores computed for the previous layer to generate a respective head output for the reuse head based on the layer input. The operations include generating a layer output based on the respective head outputs of the one or more reuse heads of the plurality of attention heads of the reuse layer.

In some implementations, for at least one of the one or more reuse layers, the one or more reuse heads comprise all the plurality of attention heads of the reuse layer.

In some implementations, for at least one of the one or more reuse layers, the one or more reuse heads comprise a proper subset of the plurality of attention heads of the reuse layer.

In some implementations the operations further comprise, for each of one or more non-reuse heads of the plurality of attention heads of the reuse layer: computing one or more new attention scores based on the layer input; and using the one or more new attention scores to generate a respective head output of the non-reuse head. In some implementations, generating the layer output comprises concatenating the respective head outputs of the one or more reuse heads and the respective head outputs of the one or more non-reuse heads.

In some implementations, accessing the one or more attention scores computed for the previous layer comprises accessing a carry-forward tensor that contains the one or more attention scores computed for the previous layer. In some implementations, the operations further comprise inserting the one or more new attention scores into the carry-forward tensor.

In some implementations, the one or more reuse layers comprise all the plurality of attention layers of the machine-learned model except an initial layer.

In some implementations, the one or more reuse layers comprise a proper subset of the plurality of attention layers of the machine-learned model.

In some implementations, re-using the one or more attention scores computed for the previous layer to generate the respective head output based on the layer input comprises directly using the one or more attention scores computed for the previous layer in the reuse head. In some implementations, directly using the one or more attention scores comprises multiplying the one or more attention scores by a value matrix that is based on the layer input.

In some implementations, re-using the one or more attention scores computed for the previous layer to generate the respective head output based on the layer input comprises using a weighted combination of the one or more attention scores computed for two or more previous layers in the reuse head.

In some implementations, the weighted combination is generated using one or more learned weighting parameters.

In some implementations, a number of the reuse layers and a number of the reuse heads in each reuse layer comprise user-defined hyperparameters.

In some implementations, a number of the reuse heads in each reuse layer is constant.

In some implementations, a number of the reuse heads in each reuse layer decreases in relation to layer depth within the machine-learned model.

In some implementations, the reuse heads and the reuse layers were specified and effectuated during training of the machine-learned model.

In some implementations, the reuse heads and the reuse layers were specified and effectuated subsequent to training of the machine-learned model.

In some implementations, for each of the one or more reuse layers, the previous layer comprises a directly sequentially previous layer.

In some implementations, the model input comprises imagery and the model output comprises a prediction descriptive of a characteristic of the imagery.

In some implementations, the machine-learned model comprises an encoder portion and a decoder portion. In some implementations, at least one of the reuse layers is contained within the decoder portion. In some implementations, the previous layer in contained within the encoder portion.

In some implementations, the machine-learned model comprises a decoder-only model.

In some implementations, the one or more attention scores computed for the previous layer comprise attention scores only for preceding tokens in a sequence.

In some implementations, the machine-learned model comprises an encoder-only model.

In some implementations, the one or more attention scores computed for the previous layer comprise attention scores for both preceding and subsequent tokens in a sequence.

Another example aspect is directed to a computer-implemented method for performing attention with improved computational efficiency. The method includes obtaining a model input. The method includes processing the model input with a machine-learned model to generate a model output. In some implementations, processing the model input with the machine-learned model comprises: for at least an initial layer of the machine-learned model that comprises a first plurality of heads: newly generating a first plurality of attention scores; and computing a first layer output based on the plurality of attention scores; In some implementations, processing the model input with the machine-learned model comprises: for each of one or more reuse layers of the machine-learned model that are subsequent to the initial layer: determining a second plurality of attention scores, wherein at least some of the second plurality of attention scores are reused from one or more previous layers; and computing a second layer output based on the second plurality of attention scores.

In some implementations, for at least one of the one or more reuse layers, the one or more reuse heads comprise a proper subset of attention heads included in the reuse layer.

Another example aspect of the present disclosure is directed to or more non-transitory computer-readable media that collectively store instructions for implementing a second neural network layer in a neural network. The neural network also comprises a first neural network layer prior to the second neural network layer. The first neural network layer computes one or more attention scores based on first layer inputs to generate first layer outputs. The instructions cause one or more computers to perform operations. The operations include receiving second layer inputs to the second neural network layer. The operations include obtaining the one or more attention scores computed by the first neural network layer. The operations include generating second layer outputs based on the second layer inputs and the one or more attention scores. Generating the second layer outputs comprises re-using the one or more attention scores at least in part in place of computation of new attention scores from the second layer inputs.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
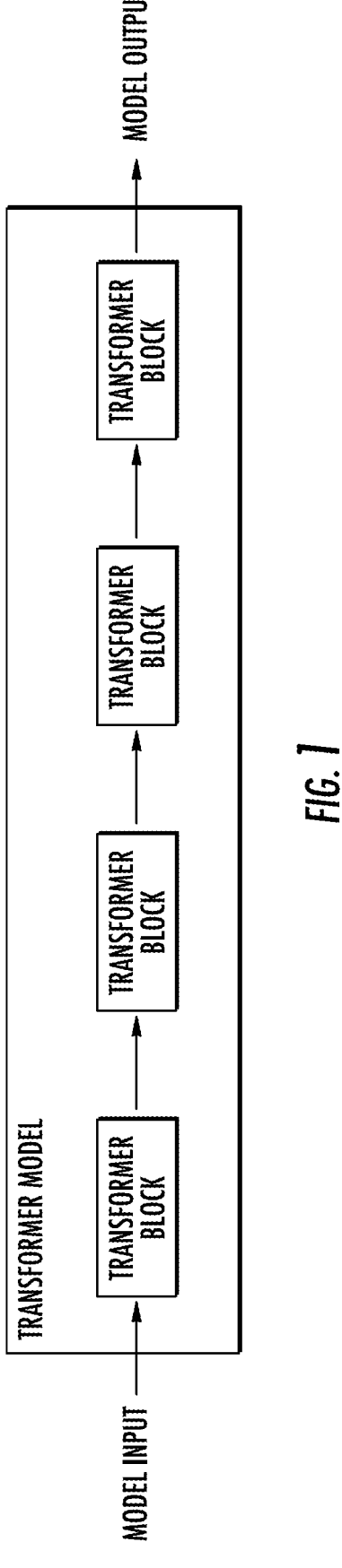
FIG. 1 depicts a simplified graphical diagram of a Transformer model.

Reference numerals that are repeated across plural figures are intended to identify the same features in various implementations.

DETAILED DESCRIPTION

Overview

Generally, the present disclosure is directed to systems and methods that improve the computational efficiency of Transformers or other self-attention-based neural networks or machine learning models by re-using a number of attention scores between layers and/or heads of the model. In particular, pairwise dot product-based attention allows Transformers to exchange information between tokens in an input-dependent way and is key to their success across diverse applications in language and vision. However, a typical Transformer model computes such pairwise attention scores repeatedly for the same sequence, in multiple heads in multiple layers, which is computationally costly. A systematic analysis of the empirical similarity of these scores across heads and layers indicates that they are considerably redundant, especially adjacent layers showing high similarity. Therefore, to reduce the computational cost of self-attention-based models while achieving comparable or even superior results, example aspects of the present disclosure propose a novel architecture that reuses attention scores computed in one layer in one or multiple subsequent layers. Example experiments on a number of standard benchmarks show that re-using attention delivers performance equivalent to or better than standard transformers, while reducing both compute and memory usage.

More particularly, the present disclosure leverages the results of a systematic analysis of the similarity in attention scores computed by different layers of a Transformer model. Similarity was evaluated for attention scores computed by heads in different layers, after appropriately matching them. The analysis showed that there is a high similarity in attention scores computed by different layers of a Transformer model, with adjacent layers often being the most similar. Further, this similarity varies for different heads in a layer with some heads having high similarity with other layers and some with less similarity. This suggests that only a few attention heads in a self-attention layer compute novel attention scores.

The present disclosure proposes novel ways in which to reduce or leverage redundancy by re-using attention computation across different layers of Transformer or other attention-based models. In particular, the present disclosure proposes computing attention only in some heads of a layer and re-using attention scores from earlier layer(s) for the remaining heads. Reusing attention scores from an earlier layer reduces computation as the layer no longer needs to compute query and key projections and the attention scores. This also reduces the number of parameters in the attention layer. Each of these effects results in a savings of computational resources such as processor usage, memory usage, network bandwidth usage, etc.

The present disclosure also considers the extreme case of re-using attention for all heads in some layers. This naturally introduces a challenge of which layers to compute/reuse attention for. Example experiments indicate that re-using attention in earlier layers leads to best performance.

The proposed approach of re-using attention scores is different from parameter/weight sharing across layers considered in earlier works. Parameter sharing in neural networks is motivated from reducing the model size and, unlike re-using attention scores, does not lead to saving in computation/FLOPs. As discussed earlier, re-using attention scores incorporates an inductive bias demonstrated on actual data into the architecture.

Example experiments contained in U.S. Provisional Patent Application No. 63/252,489 evaluate the proposed models in two different settings. In the first setting, experiments consider models that are pretrained on large datasets followed by finetuning on specific tasks. In particular the experiments consider BERT (Devlin et al., 2018), T5 (Raffel et al., 2020) and Vision Transformer (ViT) (Dosovitskiy et al., 2021) models. The experimental data includes finetuning results on GLUE (Wang et al., 2019b), SuperGlue (Wang et al., 2019a), SQuAD (Rajpurkar et al., 2016) and ImageNet benchmarks. In the second setting, experiments consider models trained from scratch on Machine Translation (WMT 2018) (Bojar et al., 2018) and the Long Range Arena (LRA) benchmark (Tay et al., 2021), designed to test performance of models for long sequence length tasks in both NLP and Vision.

In both of these settings, the example experiments demonstrate that re-using attention scores saves compute and memory while matching (and sometimes improving) the performance on the downstream tasks, showing that re-using attention scores is a useful inductive bias for Transformers across tasks. The experiments also demonstrate that reuse models that match baselines in terms of compute and parameters outperform them in downstream tasks, providing a better trade-off between resource usage and performance. Finally wall clock training time and memory usage are benchmarked and it is shown that re-using attention translates readily to real world resource savings.

Thus, example aspects of the present disclosure provide novel architectures to reuse attention scores from earlier layers of an attention-based model and reduce redundancy in attention computation.

The present disclosure provides a number of technical effects and benefits. As one example technical effect and benefit, the systems and methods described herein can conserve computational resources. In particular, the present disclosure proposes novel ways in which to reduce or leverage redundancy by re-using attention computation across different layers of Transformer or other attention-based models. In particular, the present disclosure proposes computing attention only in some heads of a layer and re-using attention scores from earlier layer(s) for the remaining heads. Reusing attention scores from an earlier layer reduces computation as the layer no longer needs to compute query and key projections and the attention scores. Thus, the number of computations overall can be reduced. Reuse of attention scores also reduces the number of parameters in the attention layer. Thus, the number of parameters in a model can be reduced, enabling storage using less memory and transmission using less network bandwidth. Each of the above effects results in a savings of computational resources such as processor usage, memory usage, network bandwidth usage, etc. Thus, the systems and methods of the present disclosure can improve the functioning of a computer. Further, example experiments indicate that, beyond the savings of computational resources described above, the proposed techniques can, in certain settings, improve the performance over baseline models.

With reference now to the Figures, example embodiments of the present disclosure will be discussed in further detail.

Example Transformer Models

FIG. 1 depicts a simplified graphical diagram of a Transformer model. The Transformer model can be configured to perform attention operations on a model input to generate a model output. In particular, the Transformer model can include a sequence of Transformer blocks, which can be viewed as a specific example of an attention layer. The illustration in FIG. 1 is simplified and generalized for the purpose of explanation. A Transformer model (and other models described herein) can include a number of other layers (e.g., feed-forward layers, cross-attention layers, etc.) or operations that are not specifically illustrated.

Figure 2:
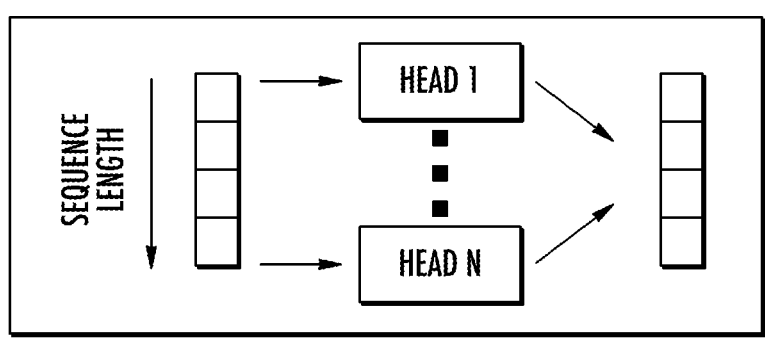
FIG. 2 depicts a simplified graphical diagram of a prior art Transformer block.
Figure 3:
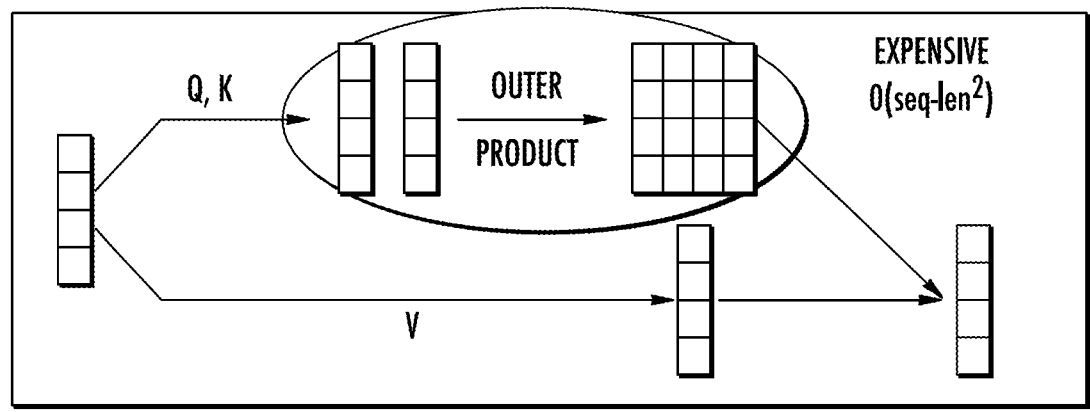
FIG. 3 depicts a simplified graphical diagram of a prior art attention head in a Transformer block.

Referring now to FIG. 2, existing Transformer models known in the art can include a number of Transformer blocks, where each Transformer block includes a plurality of attention heads. Referring now to FIG. 3, a prior art attention head in a Transformer block can perform a self-attention operation as illustrated.

Specifically, with reference to both FIGS. 2 and 3, the input to each Transformer block can be a sequence of vectors. These are usually embeddings of an input token sequence. More concretely let $X \in \mathbb{R}^{d \times n}$ be the input embedding matrix of sequence length n with embedding size d. An example self-attention layer can update these embeddings by computing pairwise dot product attention between the input embeddings. Both attention and feed-forward layers can use layer normalization and skip connections.

Self-attention layer can compute dot product based attention scores as defined below.

$$A_Z = \sigma(Z^T W_Q^T W_K Z \sqrt{d}), \qquad (1)$$

where W are trainable parameter matrices, and Z is the layer input. Here a is a column-wise softmax operator.

Projections $W_Q Z$ and $W_K Z$ are usually referred to as Query and Key projections respectively.

The attention scores can be used to linearly combine inputs as follows:

$$Y = A_Z \cdot Z^T W_V^T \cdot W_0.$$

Multi-head attention involves multiple such trainable attention heads in a single layer, whose outputs are concatenated. The output of attention layer can be fed into a token-wise feedforward layer: $W_2 \phi(W_1 Y^T)$. $\phi$ is usually a non-linear activation such as Gelu.

Example Attention Models with Attention Reuse

Figure 4:
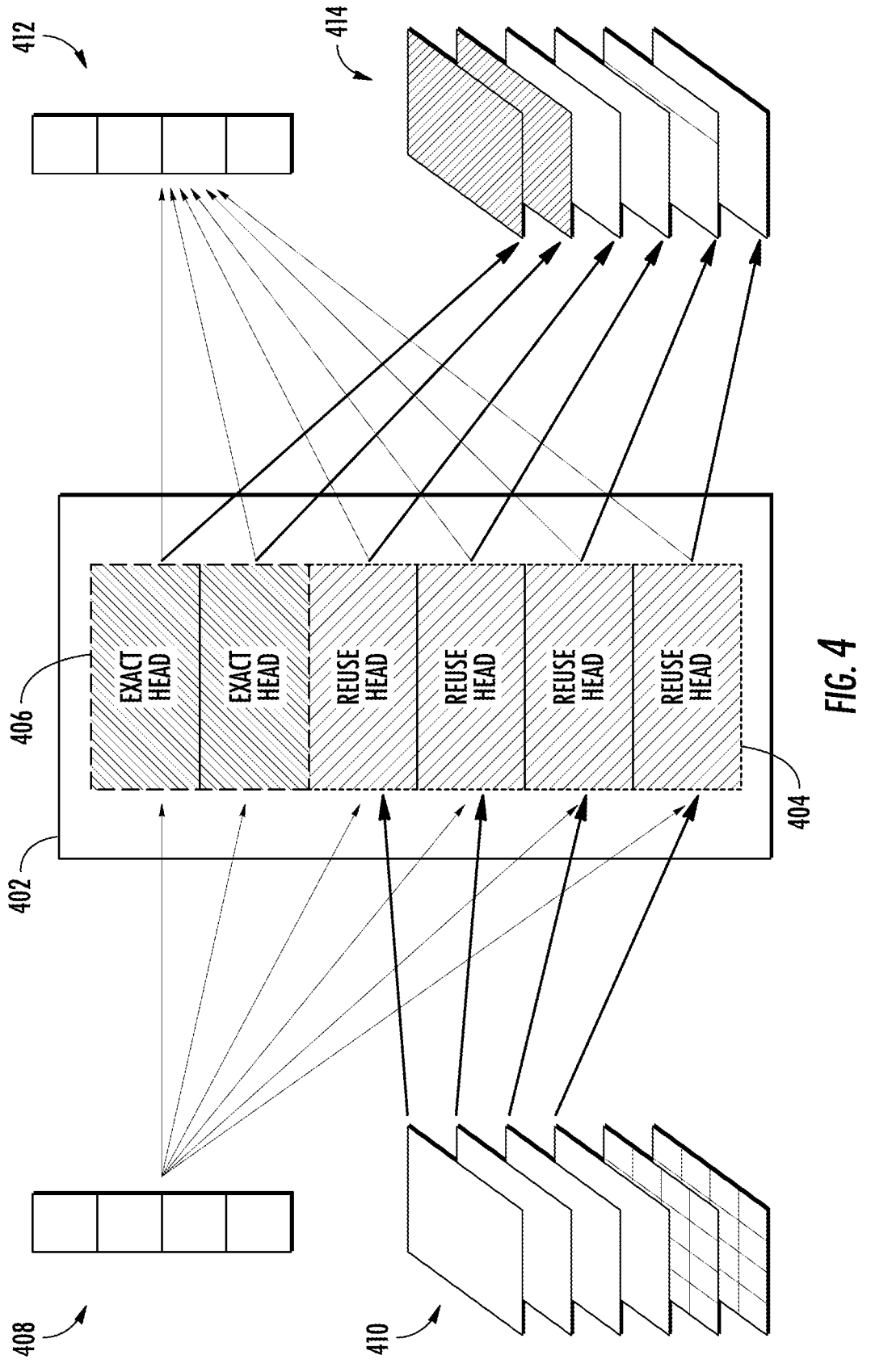
FIG. 4 depicts a graphical diagram of an example attention layer that includes both reuse heads and non-reuse heads according to example embodiments of the present disclosure.
Figure 5:
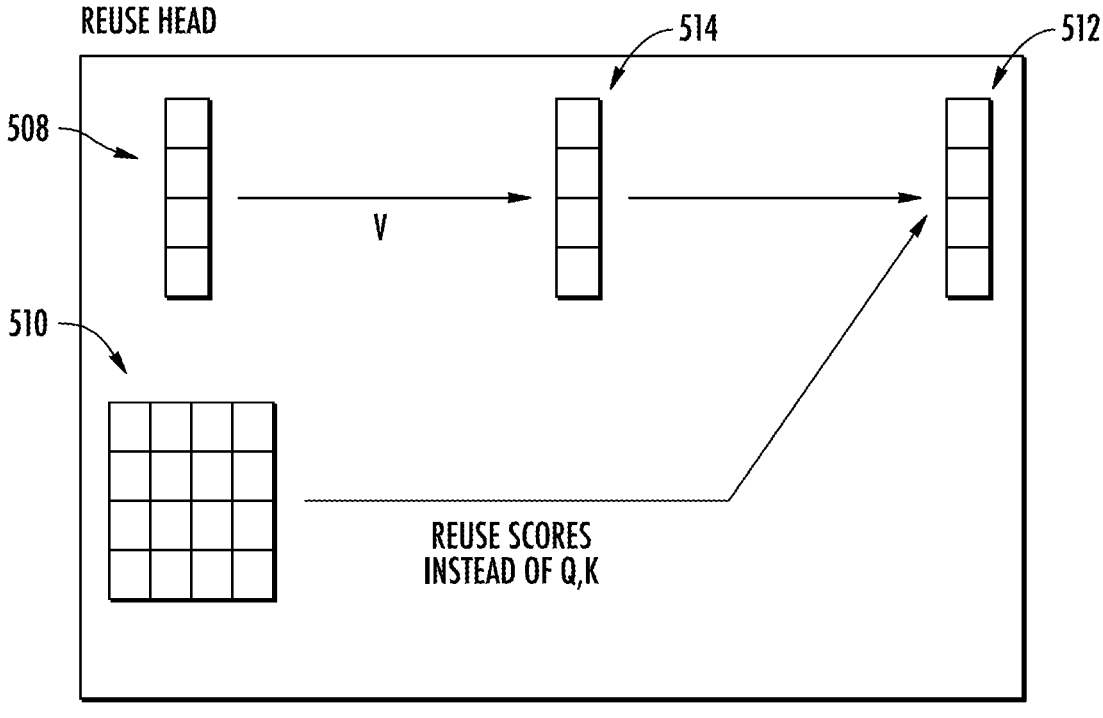
FIG. 5 depicts a graphical diagram of an example reuse head according to example embodiments of the present disclosure.

FIG. 4 depicts a graphical diagram of an example attention layer 402 that includes both reuse heads 404 and non-reuse heads 406 (AKA exact heads) according to example embodiments of the present disclosure. Given that the attention layer 402 includes reuse heads 404, the attention layer 402 can also be referred to as a reuse layer. FIG. 5 depicts a more detailed graphical diagram of an example reuse head according to example embodiments of the present disclosure.

More particularly, referring first to FIG. 4, the reuse layer 402 can receive a layer input 408. The reuse layer 402 can access one or more attention scores 410 computed for a previous layer of a plurality of attention layers included in a machine-learned model.

For each of the reuse heads 404 of the reuse layer 402, the reuse layer 402 can reuse the one or more attention scores 410 computed for the previous layer to generate a respective head output for the reuse head based on the layer input 408. In FIG. 4, six matrices of attention scores are shown and four are used by the four reuse heads 404 to generate their respective head outputs. FIG. 5 shows this process in more detail.

However, referring still to FIG. 4, the reuse layer 402 can generate a layer output 412 based on the respective head outputs of the reuse heads 404. The layer output 412 can, for example, be provided as layer input to the next sequential attention layer.

In some implementations, for at least one of one or more reuse layers included in a model, the reuse heads can be a proper subset of the plurality of attention heads of the reuse layer. For example, as shown in FIG. 4, the layer 402 includes six heads total, four of which are reuse heads. Additionally or alternatively, for at least one of the one or more reuse layers in a model, the one or more reuse heads can be all the plurality of attention heads of the reuse layer. That is, in another approach, all six of the heads of layer 402 could be reuse heads.

Referring still to FIG. 4, for the non-reuse heads 406, the attention layer 402 can compute one or more new attention scores based on the layer input 408. The attention layer 402 can use the one or more new attention scores to generate a respective head output of each non-reuse head. Generating the layer output 412 can include concatenating the respective head outputs of the one or more reuse heads 404 and the respective head outputs of the one or more non-reuse heads 406.

In some implementations, the one or more attention scores 410 computed for the previous layer(s) can be held in a carry-forward tensor. In some implementations, the computing system implementing the reuse layer 402 can insert the one or more new attention scores generated from the non-reuse heads 406 into the carry-forward tensor. For example, as shown at 414 of FIG. 4, the new attention scores computed for the non-reuse heads 406 can be carried forward for the next attention layer. For example, attention scores can be carried forward in a first-in-first-out manner. Thus, in some instances, the attention score used by a reuse layer can come from a directly sequentially previous layer, while in other instances, the reused scores may come from a previous layer that is not directly sequentially previous.

In some implementations, all the plurality of attention layers included in a machine-learned model, except an initial layer, can be reuse layers. Alternatively, in other implementations, only a proper subset of the attention layers included in a machine-learned model can be reuse layers.

Referring now to FIG. 5, each reuse head can reuse one or more attention scores 510 computed for previous layer(s) to generate a respective head output 512 based on the layer input 508.

For example, as illustrated in FIG. 5, the reuse head can directly use the previous attention scores 510 computed for the previous layer. In particular, directly using the one or more attention scores 510 can include multiplying the one or more attention scores by a value matrix 514 that is based on the layer input 508.

Alternatively, in another approach, re-using the one or more attention scores computed for the previous layer to generate the respective head output based on the layer input can include using a weighted combination of the one or more attention scores computed for two or more previous layers in the reuse head. For example, the weighted combination can be generated using one or more learned weighting parameters. The learned weighting parameters can be model parameters that are learned jointly with the other parameters of the model. Thus, in some implementations, certain model parameters can be learned and can control which prior attention scores are carried forward and how much weight is given to such carried-forward scores.

In some implementations, a number of the reuse layers and a number of the reuse heads in each reuse layer comprise user-defined hyperparameters. Thus, a user can define where and how much attention reuse occurs. In some implementations, a number of the reuse heads in each reuse layer is constant. In other implementations, a number of the reuse heads in each reuse layer is varying. As one example, in some implementations, a number of the reuse heads in each reuse layer decreases in relation to layer depth within the machine-learned model. That is, more reuse can occur in earlier layers while less reuse occurs in later layers.

In some implementations, the reuse heads and the reuse layers can be specified and effectuated during training of the machine-learned model. For example, the architecture of the model can be initially defined with attention reuse. In some of such cases, when a gradient of a loss is backpropagated, the loss can pass through the reused attention scores to the original point of computation.

However, in other implementations, the reuse heads and the reuse layers can be specified and effectuated subsequent to training of the machine-learned model. As one example, starting from an existing, pre-trained model, a number of test inputs can be provided to the model. A similarity analysis can be performed to identify which layers/heads provide the most similar (redundant) attention scores. These layers/heads can then be linked with reuse as described herein to achieve computational efficiency gains.

Example Implementation Details and Algorithm

Recall that the output of the attention layer/of a Transformer model with H heads is $$MultiHead \text{ Attention } Concat_{h \in [1,H]}\left[A_{l,h} \cdot Z^T (W_V)_{l,h}^T\right] \cdot W_0$$

Here Concat denotes the concatenate operation on the last dimension. $A_{l,h}$ denotes the attention scores computed by head h in layer l (see equation 1). For simplicity we drop the dependency of $A_{l,h}$ on the layer input Z.

This section now defines an example reuse multihead attention layer in a Transformer model with L layers and H heads. Let P<L be the number of layers that are reuse layers and K<H be the number of heads that reuse the attention scores per reuse layer. Then, the attention layer of the Transformer only computes attention scores for H-K heads in P layers and reuses attention scores from an earlier layer for K heads. One example implementation of this attention computation is described in Algorithm 1. Algorithm 1 contains one example approach which has fixed K and other design choices. The present disclosure is not limited to the example implementation described in Algorithm 1.

First layer—Lines 2-3 Alg. 1 In the first layer, the implementing computing system computes attention scores for all the heads as there is no earlier layer to reuse scores from. The computing system also passes the attention scores to next layer for reuse ($R_1$).

Reuse attention scores—Lines 5-6, Alg. 1 For any subsequent layer l, the computing system computes attention scores for H-K heads only and for the remaining K heads the computing system reuses the attention scores of the first K heads from $R_{l-1}$.

Setting reuse attention scores—Line 7, Alg. 1 Finally the computing system assigns reuse attention scores $R_1$ to be passed to next layer. In some implementations, the computing system does this by concatenating the H-K attention scores computed in the current layer with the attention scores from the first K heads of the earlier layer $R_{l-1}$. This ensures that the attention scores computed in the current layer are reused first in the next layer.

Remaining layers—Line 10, Alg. 1 Layers from P+1 to L again compute attention scores for all layers.

Note that this section only describes the attention score computation part as the rest of the layer is the same as in equation 4. The above reuse attention architecture can be easily extended to the cross-attention layer in the decoder models (Vaswani et al., 2017), by re-using the cross attention scores from earlier layers.

Note that re-using attention scores is fundamentally different from sharing weight/parameter matrices across layers (Dehghani et al., 2018; Lan et al., 2019). Parameter sharing is motivated primarily by reduction of model size, while our attention reuse is motivated in part by the need to analyze learned Transformer networks. While parameter sharing helps in reducing the model size, it doesn't reduce the computation/FLOPS. Also, sharing the parameter matrices can result in different attention scores per layer, as the input differs for each layer.

The parameters P, K control how much attention computation is reused in the Transformer model, reducing the number of attention computations from L*H heads to (L*H−P*K). Note that for a given reuse budget (P*K) there are many ways of choosing parameters P and K. Two different example possibilities are described immediately below Partial layer Reuse. In this example setting, the number of reuse layers P is always set to be L−2. K can be varied such that all heads of the first and last layer compute attention scores, and rest of the layers reuse K heads. In this architecture, every layer has at least one head (when K<H) that computes attention scores.

Full layer Reuse. In this example setting, K is always set to be H, and P can be varied. In such setting, attention is not computed in P layers of the model and is reused from the

---

Algorithm 1 Reuse MultiHead Attention

1: Given: # layers L and heads H. Reuse layers P < L and reuse heads K ≤ H.
2: Layer 1: Compute attention scores $A_{1,h}$, $\forall h \in [H]$.  ▷ First layer is always exact.
3: Set Reuse attention scores $R_{1,h} = A_{1,h}$, $\forall h \in [H]$.
4: for l = 2, ... , P + 1 do          ▷ Reuse K heads in the next P layers.
5:    Compute attention scores only for H − K heads $A_{l,h \in [1,H-K]}$.
6:    Reuse attention scores for K heads $A_{l,h \in [H-K+1,H]} = R_{l-1,h \in [1,K]}$.
7:    Set Reuse attention scores $R_l = [A_{l,h \in [1,H-K]}, A_{l,h \in [H-K+1,H]}]$.
8: end for
9: for l = P + 2, ... , L do          ▷ Remaining L − P − 1 layers are exact.
10: Compute attention scores for all heads $A_{l,h}$, $\forall h \in [H]$.
11: end for earlier layer. Note that the first layer can again be set to exact to be able to reuse the attention scores in the following layers.

Example Discussion of Computational Complexity

Reusing the attention scores reduces both memory and computation of attention layer as heads that reuse attention scores do not have to compute the query and key projections as well. Thus in some example implementations, the model reduces the attention score computation cost in each layer from $H \cdot n^2$ to $(H-K) \cdot n^2$, for input sequence length n with K heads being reused. This reduces the overall computational complexity of the multihead attention layer from $4 \cdot d^2 \cdot n+ 2 \cdot d \cdot n^2$ to $$\left(1 - \frac{K}{2H}\right) \cdot [4 \cdot d^2 \cdot n + 2 \cdot d \cdot n^2].$$

Similarly, this reduces the number of parameters from $4 \cdot d^2$ to $$\left(1 - \frac{K}{2H}\right) \cdot [4 \cdot d^2]$$

Example Devices and Systems

Figure 6A:
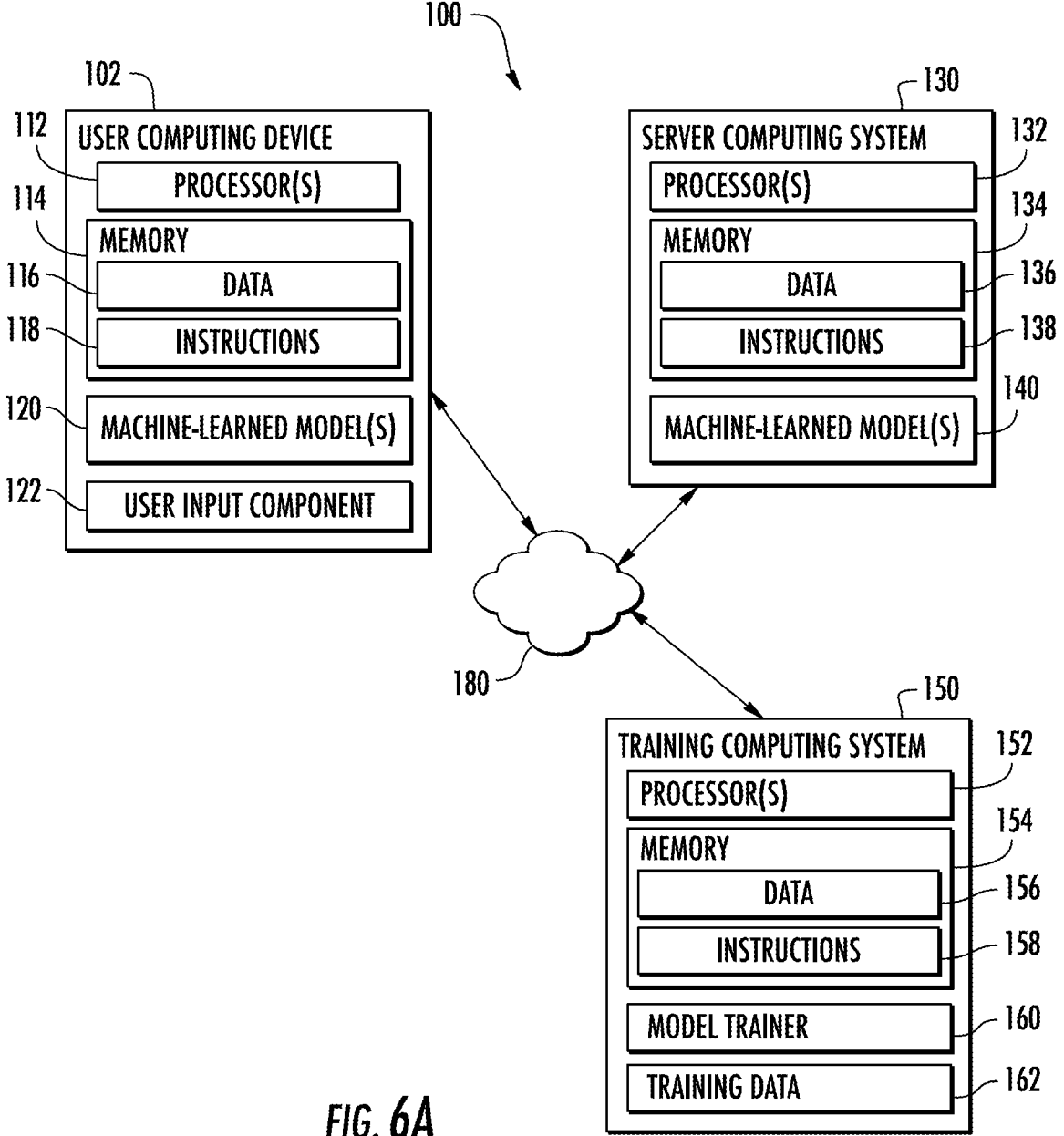
FIG. 6A depicts a block diagram of an example computing system according to example embodiments of the present disclosure.

FIG. 6A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel attention computation across multiple instances of inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a prediction service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 6A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 6B:
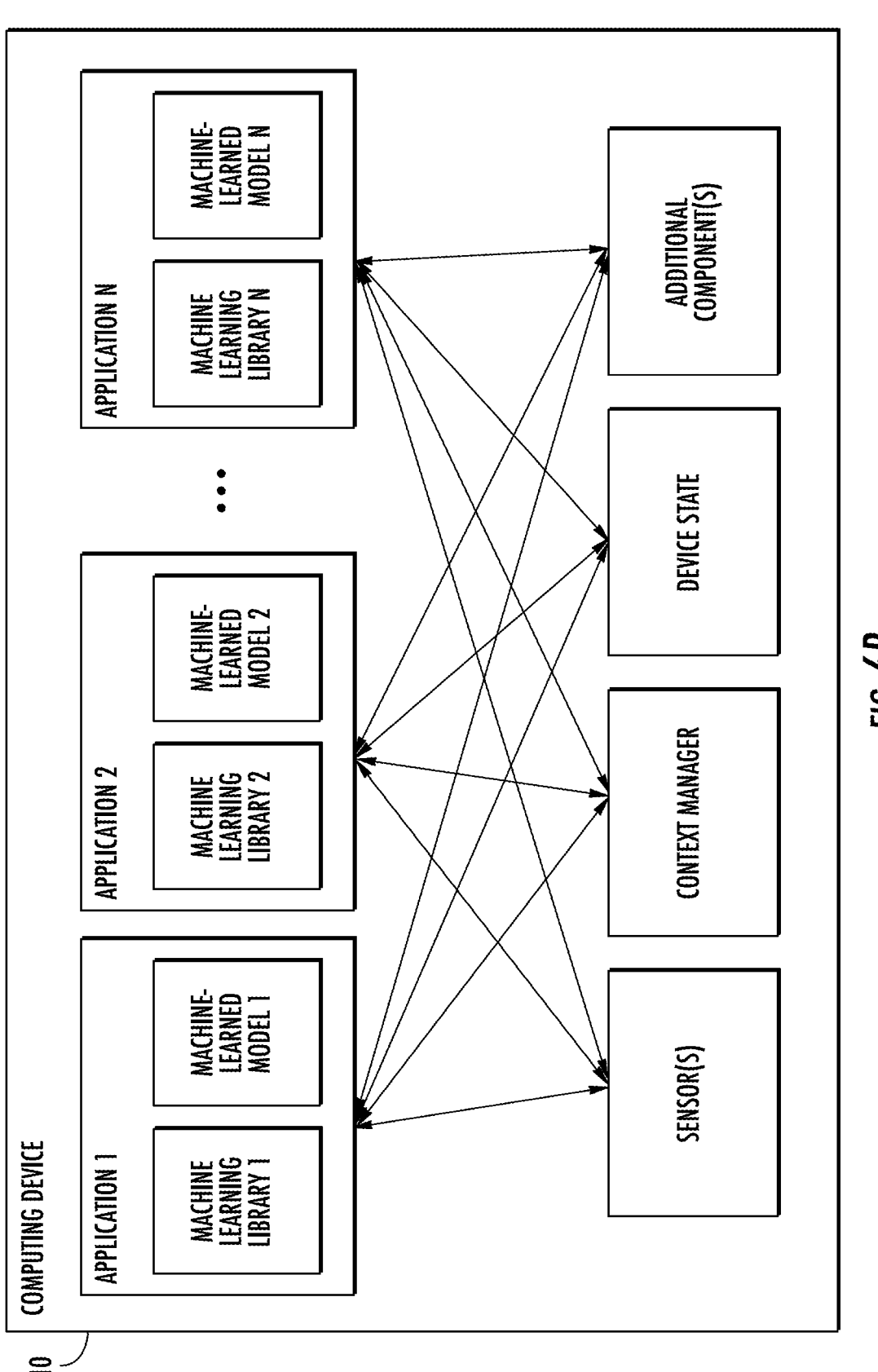
FIG. 6B depicts a block diagram of an example computing device according to example embodiments of the present disclosure.

FIG. 6B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
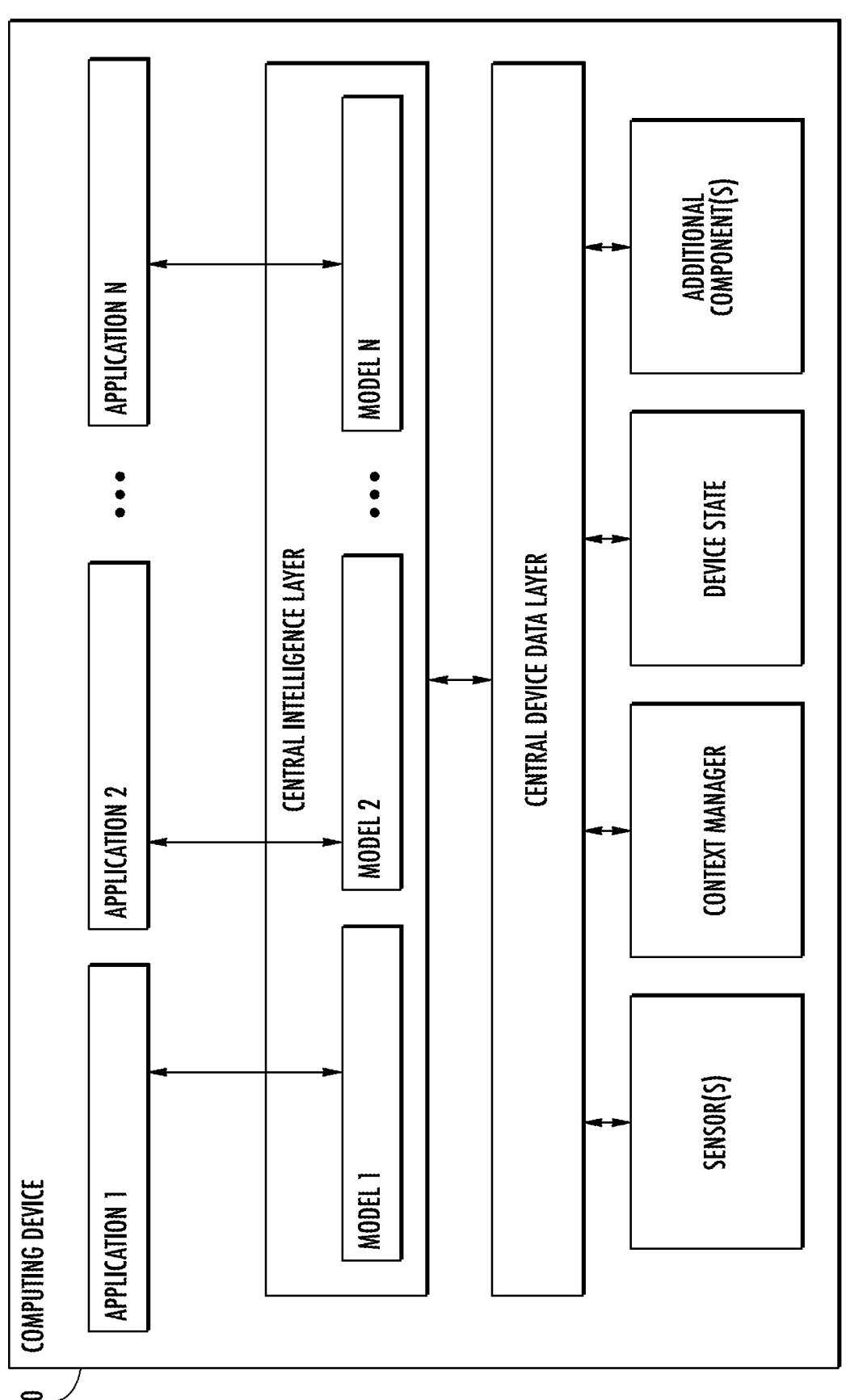
FIG. 6C depicts a block diagram of an example computing device according to example embodiments of the present disclosure.

FIG. 6C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for performing attention with improved computational efficiency, the computing system comprising:

one or more processors; and one or more non-transitory computer-readable media that collectively store:

a machine-learned model configured to perform attention operations on a model input to generate a model output, wherein the machine-learned model comprises a plurality of attention layers, and wherein each attention layer comprises a plurality of attention heads; and instructions that, when executed by the one or more processors, cause the computing system to perform operations, the operations comprising:

obtaining the model input; and processing the model input with the machine-learned model to generate the model output, wherein processing the model input with the machine-learned model comprises, for one or more reuse layers of the plurality of attention layers:

receiving a layer input;

accessing one or more attention scores computed for a previous layer of the plurality of attention layers; and for one or more reuse heads of the plurality of attention heads of the one or more reuse layers, re-using the one or more attention scores computed for the previous layer to generate respective head outputs for the one or more reuse heads based on the layer input, wherein, for at least one of the one or more reuse layers, the one or more reuse heads comprise a proper subset of the plurality of attention heads of the one or more reuse layers; and generating a layer output based on the respective head outputs of the one or more reuse heads of the plurality of attention heads of the reuse layer.

2. The computing system of claim 1, wherein:

the operations further comprise, for each of one or more non-reuse heads of the plurality of attention heads of the reuse layer:

computing one or more new attention scores based on the layer input; and using the one or more new attention scores to generate a respective head output of the non-reuse head;

wherein generating the layer output comprises concatenating the respective head outputs of the one or more reuse heads and the respective head outputs of the one or more non-reuse heads.

3. The computing system of claim 2, wherein:

accessing the one or more attention scores computed for the previous layer comprises accessing a carry-forward tensor that contains the one or more attention scores computed for the previous layer; and the operations further comprise inserting the one or more new attention scores into the carry-forward tensor.

4. The computing system of claim 1, wherein the one or more reuse layers comprise all the plurality of attention layers of the machine-learned model except an initial layer.

5. The computing system of claim 1, wherein the one or more reuse layers comprise a proper subset of the plurality of attention layers of the machine-learned model.

6. The computing system of claim 1, wherein re-using the one or more attention scores computed for the previous layer to generate the respective head output based on the layer input comprises directly using the one or more attention scores computed for the previous layer in the reuse head, wherein directly using the one or more attention scores comprises multiplying the one or more attention scores by a value matrix that is based on the layer input.

7. The computing system of claim 1, wherein re-using the one or more attention scores computed for the previous layer to generate the respective head output based on the layer input comprises using a weighted combination of the one or more attention scores computed for two or more previous layers in the reuse head.

8. The computing system of claim 7, wherein the weighted combination is generated using one or more learned weighting parameters.

9. The computing system of claim 1, wherein a number of the reuse layers and a number of the one or more reuse heads in each reuse layer comprise user-defined hyperparameters.

10. The computing system of claim 1, wherein a number of the one or more reuse heads in each reuse layer is constant.

11. The computing system of claim 1, wherein a number of the one or more reuse heads in each of the one or more reuse layers decreases in relation to layer depth within the machine-learned model.

12. The computing system of claim 1, wherein the one or more reuse heads and the one or more reuse layers were specified and effectuated during training of the machine-learned model.

13. The computing system of claim 1, wherein the one or more reuse heads and the one or more reuse layers were specified and effectuated subsequent to training of the machine-learned model.

14. The computing system of claim 1, wherein, for each of the one or more reuse layers, the previous layer comprises a directly sequentially previous layer.

15. The computing system of claim 1, wherein the model input comprises imagery and the model output comprises a prediction descriptive of a characteristic of the imagery.

16. The computing system of claim 1, wherein the machine- learned model comprises an encoder portion and a decoder portion, wherein at least one of the one or more reuse layers is contained within the decoder portion, and wherein the previous layer in contained within the encoder portion.

17. The computing system of claim 1, wherein the machine-learned model comprises a decoder-only model.

18. The computing system of claim 1, wherein the one or more attention scores computed for the previous layer comprise attention scores only for preceding tokens in a sequence.

19. The computing system of claim 1, wherein the machine-learned model comprises an encoder-only model.

20. The computing system of claim 1, wherein the one or more attention scores computed for the previous layer comprise attention scores for both preceding and subsequent tokens in a sequence.

21. A computer-implemented method for performing attention with improved computational efficiency, the method comprising:

obtaining a model input; and processing the model input with a machine-learned model to generate a model output;

wherein processing the model input with the machine-learned model comprises:

for at least an initial layer of the machine-learned model that comprises a first plurality of heads:

newly generating a first plurality of attention scores; and computing a first layer output based on the plurality of attention scores; and for each of one or more reuse layers of the machine-learned model that are subsequent to the initial layer:

determining a second plurality of attention scores, wherein at least some of the second plurality of attention scores are reused from one or more previous layers in one or more reuse attention heads of the reuse layer, the one or more reuse attention heads comprising a proper subset of a plurality of attention heads of the reuse layer; and computing a second layer output based on the second plurality of attention scores.

22. One or more non-transitory computer-readable media that collectively store:

instructions for implementing a second neural network layer in a neural network, wherein the neural network also comprises a first neural network layer prior to the second neural network layer, wherein the first neural network layer computes one or more attention scores based on first layer inputs to generate first layer outputs, and wherein the instructions cause one or more computers to perform operations comprising:

receiving second layer inputs to the second neural network layer;

obtaining the one or more attention scores computed by the first neural network layer; and generating second layer outputs based on the second layer inputs and the one or more attention scores;

wherein generating the second layer outputs comprises re-using, by one or more reuse attention heads of the second neural network layer, the one or more attention scores at least in part in place of computation of new attention scores from the second layer inputs, the one or more reuse attention heads comprising a proper subset of a plurality of attention heads of the second neural network layer.

23. The one or more non-transitory computer-readable media of claim 22, wherein re-using the one or more attention scores at least in part in place of computation of new attention scores from the second layer inputs comprises:

computing a linear combination of input embeddings in the second layer inputs using the one or more attention scores.

* * * * *